UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVER.

1,069,057.  Specification of Letters Patent.  Patented July 29, 1913.

No Drawing.  Application filed December 12, 1907. Serial No. 406,222.

*To all whom it may concern:*

Be it known that I, CARLETON ELLIS, a citizen of the United States, and resident of Larchmont, in the county of Westchester and State of New York, have made certain new and useful Inventions Relating to Finish-Removers, of which the following is a specification.

This invention relates to finish removers and relates especially to non-inflammable removers comprising allyl alcohol or equivalent substantially water-insoluble finish solvent material of a moderately volatile character with which a comparatively small proportion of carbon-tetrachlorid or other non-inflammable solvent material has been incorporated.

Allyl alcohol, and especially the quasi allyl alcohol produced as a by-product in wood alcohol manufacture and sold under the name of allyl alcohol are substantially water-insoluble finish solvents which of course are practically free from water. These solvents are only moderately volatile, that is, are not nearly so volatile as ordinary wood alcohol, for instance, and therefore do not give off nearly so much inflammable vapor when used in removers. For this reason it is only necessary to incorporate a comparatively small proportion of chlorinated solvent material with quasi allyl alcohol and similarly acting finish solvent material in order to suppress the evolution of explosive vapors and the inflammability of the removers, so that they can be used under ordinary service conditions. Substantially water insoluble alcoholic or ketonic loosening finish solvent material of this character has substantially no decomposing action on the chlorinated solvent material used to suppress its inflammability and therefore the remover does not need to be put up in special containers or include special neutralizing or antacid material to obviate the acid-forming tendency of the chlorinated solvents which seems to be due to hydrolysis.

Various chlorinated bodies preferably having a solvent action may be used in such removers to suppress inflammability including carbon-tetrachlorid and acetylene tetrachlorid or tetrachlor ethane, 10% to 20% of such chlorinated solvents being usually sufficient to secure the desired non-inflammable character of the remover when the other solvent material is substantially composed of allyl alcohol or similar moderately volatile loosening finish solvent material. Of course a relatively small proportion of more volatile finish solvent material may be used in these removers without sacrificing their non-inflammable and other desirable properties, and of course, considerable quantities of many other moderately volatile solvents may be incorporated in the remover, as well as acetic, cresylic and carbolic acids, creosote, etc. Although not always necessary suitable stiffening material is usually desirable in these removers, such as flour, starch, wood flour, whiting, fullers' earth, magnesia, infusorial earth and also waxy, soapy or gelatinous stiffening material, including paraffin, ceresin and peat wax, which may be conveniently prepared by extracting dry granular peat with hot alcohol or its vapors and subsequently distilling to separate the dark peat wax which like the other waxes mentioned has desirable evaporation-retarding properties. If desired also suitable antacid material, such as anilin, for instance, may be incorporated in the remover to correct any acid-forming tendency.

A suitable illustrative remover of this character may comprise quasi allyl alcohol 40 parts, carbon-tetrachlorid 10 parts, ceresin wax 2 parts, and peat wax 1 part, the ingredients of these removers being, of course, preferably thoroughly incorporated by agitation at the desired slight rise of temperature.

Another illustrative remover may comprise allyl alcohol 30 parts, turpentine 10 parts, acetylene tetrachlorid 10 parts, ceresin 1 part, and peat wax 1 part.

Another illustrative remover may comprise allyl alcohol 45 parts, acetylene tetrachlorid 5 parts and paraffin wax 1 part.

Another illustrative remover may comprise quasi allyl alcohol 35 parts, turpentine 5 parts, carbon-tetrachlorid 10 parts and Japan wax 2 parts.

The invention has been described in this case in connection with a number of illustrative ingredients, processes, relative proportions and formulas, to the details of which disclosure the invention is not, of course, to be limited.

What is claimed is:

1. The non-inflammable finish remover comprising approximately quasi allyl alcohol 40 parts, carbon-tetrachlorid 10 parts, ceresin 2 parts and peat wax 1 part.

2. The non-inflammable finish remover comprising approximately quasi allyl alcohol 40 parts, miscible chlorinated solvent material 10 parts, and stiffening material.

3. The substantially non-aqueous non-inflammable finish remover consisting largely of quasi allyl alcohol with which a smaller proportion of chlorinated finish solvent material has been incorporated and a few per cent. of stiffening material including wax.

CARLETON ELLIS.

Witnesses:
HARRY L. DUNCAN,
JESSIE B. KAY.